(12) United States Patent
Ocon et al.

(10) Patent No.: US 8,831,110 B2
(45) Date of Patent: Sep. 9, 2014

(54) ELECTRONIC NEWS GATHERING METHOD AND SYSTEM FOR THE PRIORITIZED TRANSMISSION OF DATA

(76) Inventors: James D. Ocon, Colorado Springs, CO (US); Peter Gogas, Bryan, TX (US); Scott King, Reno, NV (US)

(*) Notice: Subject to any disclaimer, the term of this patent is extended or adjusted under 35 U.S.C. 154(b) by 340 days.

(21) Appl. No.: 13/226,076

(22) Filed: Sep. 6, 2011

(65) Prior Publication Data

US 2013/0022131 A1    Jan. 24, 2013

Related U.S. Application Data

(60) Provisional application No. 61/509,796, filed on Jul. 20, 2011.

(51) Int. Cl.
| | |
|---|---|
| H04N 7/12 | (2006.01) |
| H04L 29/06 | (2006.01) |
| H04N 21/2187 | (2011.01) |
| H04N 21/434 | (2011.01) |
| H04N 19/61 | (2014.01) |
| H04W 4/06 | (2009.01) |
| H04N 19/40 | (2014.01) |
| H04N 21/2365 | (2011.01) |
| H04N 19/176 | (2014.01) |

(52) U.S. Cl.
CPC ............ *H04L 65/80* (2013.01); *H04N 21/2187* (2013.01); *H04N 19/00781* (2013.01); *H04W 4/06* (2013.01); *H04N 7/50* (2013.01); *H04N 7/26941* (2013.01); *H04N 21/2365* (2013.01); *H04N 21/4347* (2013.01); *H04N 7/26244* (2013.01)

USPC .............. 375/240.26; 375/24.27; 375/240.28; 375/240.29; 375/240.01

(58) Field of Classification Search
CPC . H04N 7/50; H04N 7/26941; H04N 21/2365; H04N 21/4347; H04N 7/26244; H04N 21/2187; H04N 19/00781; H04N 21/2665; H04L 65/80; H04W 4/06
USPC ...................................................... 375/240.26
See application file for complete search history.

(56) References Cited

U.S. PATENT DOCUMENTS

| | | | | |
|---|---|---|---|---|
| 4,339,772 | A * | 7/1982 | Eilers et al. | 348/485 |
| 5,440,336 | A * | 8/1995 | Buhro et al. | 725/93 |
| 5,568,205 | A | 10/1996 | Hurwitz | |
| 5,924,039 | A | 7/1999 | Hugenberg et al. | |
| 6,275,529 | B1 * | 8/2001 | Sato | 375/240.01 |
| 6,513,003 | B1 | 1/2003 | Angell et al. | |
| 6,539,025 | B1 | 3/2003 | Manning et al. | |
| 6,798,756 | B1 | 9/2004 | Kosugi | |
| 7,002,934 | B2 | 2/2006 | Dolgonos et al. | |
| 7,131,136 | B2 * | 10/2006 | Monroe | 725/105 |

(Continued)

*Primary Examiner* — Andy Rao
*Assistant Examiner* — Shan Elahi
(74) *Attorney, Agent, or Firm* — The Belles Group, P.C.

(57) ABSTRACT

A method of remotely uploading recordings of live events to a broadcast station includes: a) recording live events at remote locations using a plurality of electronic news gathering (ENG) units, each of the live events being recorded by one of the ENG units as a signal; b) each of the ENG units encoding the signal into a data stream; c) assigning a priority level to each of the data streams; d) transmitting the data streams of the ENG units to the broadcast station through at least one base station, wherein the transmission of the data streams is prioritized based on the assigned priority levels; and e) receiving and decoding the data streams at the broadcast station.

29 Claims, 9 Drawing Sheets

(56) References Cited

U.S. PATENT DOCUMENTS

| | | | |
|---|---|---|---|
| 7,327,959 B2* | 2/2008 | Pelletier et al. | 398/139 |
| 7,386,628 B1* | 6/2008 | Hansell et al. | 709/238 |
| 7,471,733 B1 | 12/2008 | Payne, III et al. | |
| 7,500,261 B1 | 3/2009 | Myers | |
| 7,567,620 B2 | 7/2009 | Rozental | |
| 7,734,730 B2 | 6/2010 | McCanne | |
| 7,870,588 B2 | 1/2011 | Guo | |
| 7,920,895 B2 | 4/2011 | van Rooyen | |
| 7,948,933 B2* | 5/2011 | Ohayon et al. | 370/328 |
| 7,953,255 B2 | 5/2011 | Amento et al. | |
| 8,224,316 B2* | 7/2012 | Mueller et al. | 455/431 |
| 8,292,433 B2* | 10/2012 | Vertegaal | 351/209 |
| 8,467,337 B1* | 6/2013 | Ohayon et al. | 370/328 |
| 8,488,659 B2* | 7/2013 | Ohayon et al. | 375/222 |
| 8,589,994 B2* | 11/2013 | Monroe | 725/105 |
| 8,649,402 B2* | 2/2014 | Ohayon et al. | 370/537 |
| 2002/0137464 A1* | 9/2002 | Dolgonos et al. | 455/60 |
| 2003/0112338 A1* | 6/2003 | Pelletier et al. | 348/211.99 |
| 2004/0008253 A1* | 1/2004 | Monroe | 348/143 |
| 2004/0040041 A1* | 2/2004 | Crawford | 725/88 |
| 2004/0201695 A1* | 10/2004 | Inasaka | 348/207.99 |
| 2005/0055729 A1* | 3/2005 | Atad et al. | 725/118 |
| 2005/0094567 A1* | 5/2005 | Kannan et al. | 370/241 |
| 2005/0113021 A1* | 5/2005 | Gosieski et al. | 455/3.06 |
| 2005/0113136 A1* | 5/2005 | Gosieski, Jr. | 455/556.1 |
| 2005/0130717 A1* | 6/2005 | Gosieski et al. | 455/575.2 |
| 2005/0219710 A1* | 10/2005 | Hirai | 359/689 |
| 2005/0220449 A1* | 10/2005 | Hirai | 396/79 |
| 2006/0093998 A1* | 5/2006 | Vertegaal | 434/236 |
| 2007/0130599 A1* | 6/2007 | Monroe | 725/105 |
| 2007/0169151 A1 | 7/2007 | Vishloff et al. | |
| 2007/0211726 A1 | 9/2007 | Kuang et al. | |
| 2007/0220575 A1 | 9/2007 | Cooper et al. | |
| 2007/0287498 A1* | 12/2007 | Wang et al. | 455/556.1 |
| 2008/0037556 A1 | 2/2008 | Denney et al. | |
| 2008/0075031 A1* | 3/2008 | Ohayon et al. | 370/316 |
| 2008/0137623 A1 | 6/2008 | Wang et al. | |
| 2008/0285497 A1 | 11/2008 | Pichna et al. | |
| 2009/0022105 A1 | 1/2009 | Ou et al. | |
| 2009/0034630 A1* | 2/2009 | Cho et al. | 375/240.27 |
| 2009/0043891 A1 | 2/2009 | Woo et al. | |
| 2009/0257350 A1 | 10/2009 | Bugenhagen | |
| 2010/0195650 A1 | 8/2010 | Stewart | |
| 2010/0218252 A1* | 8/2010 | Ben-Shalom et al. | 726/22 |
| 2010/0251330 A1 | 9/2010 | Kroeselberg et al. | |
| 2010/0265851 A1 | 10/2010 | Shahar | |
| 2010/0265869 A1 | 10/2010 | Sarikaya | |
| 2010/0284346 A1 | 11/2010 | Rudrapatna et al. | |
| 2010/0299703 A1 | 11/2010 | Altman | |
| 2010/0329181 A1 | 12/2010 | Lan | |
| 2011/0115976 A1* | 5/2011 | Ohayon et al. | 348/425.2 |
| 2011/0211524 A1* | 9/2011 | Holmes et al. | 370/328 |

\* cited by examiner

ELECTRONIC NEWS GATHERING METHOD AND SYSTEM FOR THE PRIORITIZED TRANSMISSION OF DATA

CROSS REFERENCE TO RELATED PATENT APPLICATIONS

The present application claims the benefit of U.S. Provisional Application Ser. No. 61/509,796, filed Jul. 20, 2011, the entirety of which is hereby incorporated by reference.

FIELD OF THE INVENTION

The present invention relates to an electronic news gathering (ENG) method and system for the prioritized transmission of data in a point-to-point or point-to-multipoint network.

BACKGROUND OF THE INVENTION

Electronic news gathering (ENG) relates to the upload of news information from remote locations to a broadcast or news station. ENG can be one reporter with a simple camcorder or an entire television crew with a production/satellite truck. During ENG, audio and video data is recorded at a remote location and then transmitted to a television or news station for broadcast.

Currently, ENG can be accomplished using satellites, microwave equipment and common carrier cellular networks. For example, a vehicle may be outfitted with a satellite dish, whereby recorded news data is transmitted by the satellite dish of the ENG van to a satellite in orbit around the Earth and then to a receiving dish at a broadcast station. Similarly, a vehicle may be outfitted with a microwave transmitter, whereby recorded news data is transmitted by the microwave transmitter of the ENG van to a local microwave relay station and then to the broadcast station. Further, a vehicle may be outfitted with a cellular network transmitter, whereby recorded news data is relayed to a common carrier cellular network tower and then to the broadcast station.

However, all of the above ENG methods require the transmission of data across public frequency ranges. The use of public frequency ranges during ENG has many disadvantages, such as the broadcast company having no control over the size or scope of the network; having no control over the prioritization of data; having no control over how the data on the network is formatted or encoded; and/or reoccurring costs associated with purchasing access and bandwidth from the common carrier providers. Further, the bandwidth allocated for data transmission over a common carrier provider is controlled by the common carrier provider. Therefore, the broadcast company has no control over the amount of bandwidth allocated for their transmission, meaning the high volume data packets, such as those comprising audio/video data, may have to broken up and disseminated prior to transmission. Furthermore, during emergency situations the public frequency ranges may be occupied by multiple networks and reporters all attempting to record and upload recordings of the same event. Therefore, the network may become overloaded with traffic and the broadcast company may be unable to successfully upload the news data using the existing networks. Therefore, there is a need for an all digital, private ENG network that allows for the upload of news data to a broadcast station from a remote location in real-time. Further, there is a need for an ENG network that allows for the broadcast company to control the allocated bandwidth, as well as format, encode and prioritize the data being transmitted across the network.

SUMMARY OF THE INVENTION

One embodiment of the present invention is a method of remotely uploading recordings of live events from remote locations to a broadcast station comprising: a) recording live events at remote locations using a plurality of electronic news gathering (ENG) units, each of the live events being recorded by one of the ENG units as a signal; b) each of the ENG units encoding the signal into a data stream; c) assigning a priority level to each of the data streams; d) transmitting the data streams of the ENG units to the broadcast station through at least one base station, wherein the data streams are transmitted from the ENG unit to the at least one base station and from the at least one base station to the broadcast station, wherein the transmission of the data streams is prioritized based on the assigned priority levels; and e) receiving and decoding the data streams at the broadcast station.

Another embodiment of the present invention is an electronic news gathering (ENG) network comprising: a plurality of ENG units, each ENG unit comprising a camera, an encoder and a transceiver, each of the ENG units configured to: (1) record a live event at a remote location as a signal, (2) encode the signal as a data stream, and (3) transmit the data stream to at least one base station; the at least one base station comprising a transceiver, the at least one base station configured to: (1) receive each of the data streams from the plurality of ENG units; and (2) transmit each of the data streams to the broadcast station; the broadcast station comprising a transceiver and a decoder; the broadcast station is configured to: (1) receive each of the data streams from the at least one base station; and (2) decode each of the data streams; and wherein the ENG network is configured to: (1) assign a priority level to each of the data streams; and (2) prioritize the transmission of each of the data streams from the plurality of ENG units to the broadcast station based on the assigned priority levels.

Yet another embodiment of the present invention is a method of prioritizing the upload of a recording of a live event from a remote location comprising: transmitting network control information with a selection mechanism to an electronic news gathering (ENG) network, the network control information assigning a priority level of a data stream of a first ENG unit in the ENG network, the ENG network comprising at least two ENG units, at least one base station and a broadcast station; recording the live event at the remote location using the first ENG unit, the live event being recorded by the first ENG unit as a signal; encoding the signal into the data stream with the ENG unit; transmitting the data stream with the first ENG unit to the broadcast station via the at least one base station, wherein the transmission of the data stream is prioritized based on the assigned priority level; and receiving and decoding the data stream at the broadcast station.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or its uses.

The present invention relates to an electronic news gathering (ENG) method and system for the prioritized transmission of data in a point-to-point or point-to-multipoint network.

Figure 1:
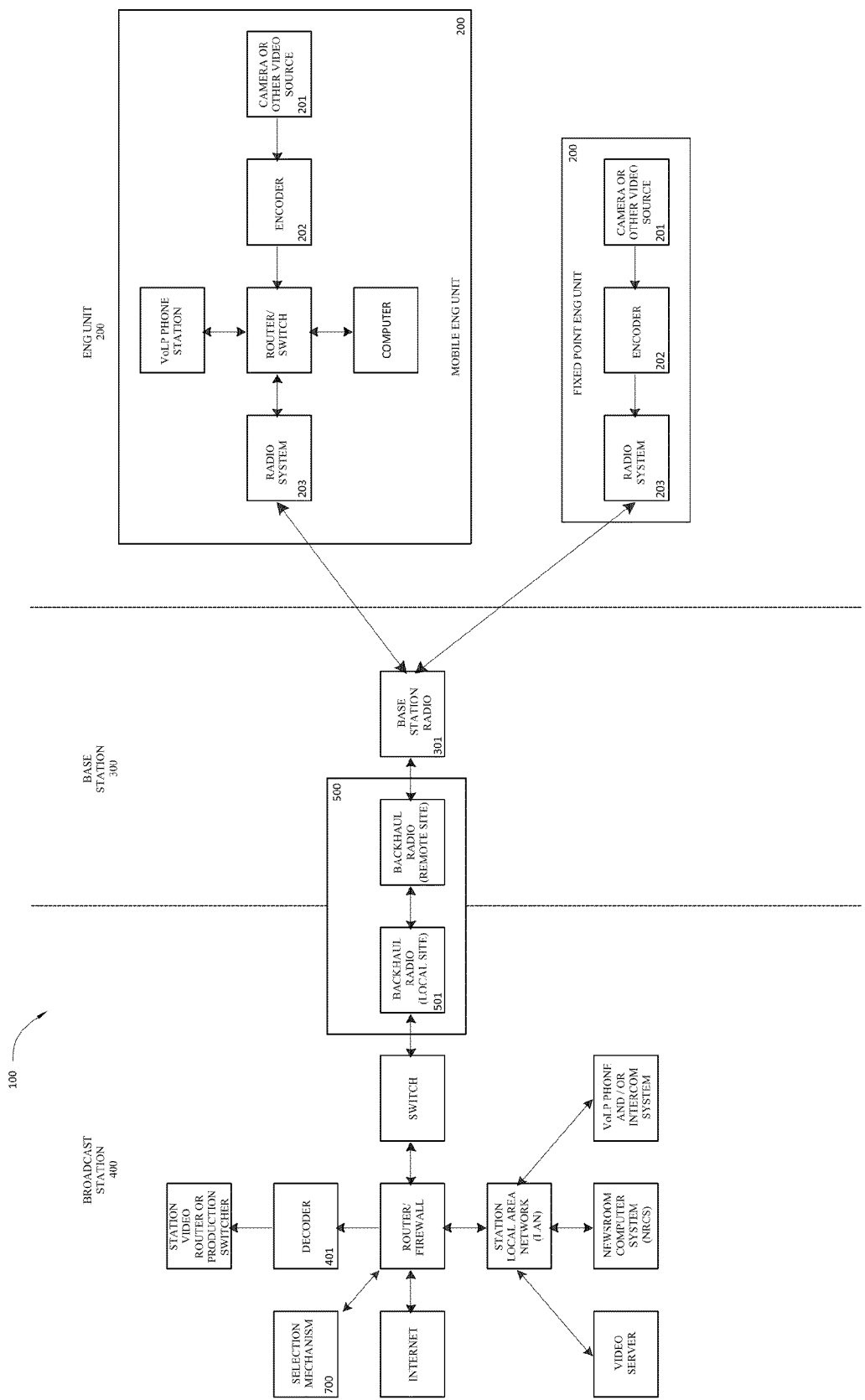
FIG. 1 illustrates a schematic of an ENG network according to an embodiment of the present invention.

Referring to FIG. 1, a schematic of an ENG network 100 according to an embodiment of the present invention is illustrated. The ENG network 100 comprises at least one ENG unit 200, at least one base station 300 and a broadcast station 400. Further, the ENG network 100 may further comprise at least one backhaul data link 500 and/or a selection mechanism 700. In the preferred embodiment, the ENG network 100 comprises a plurality of ENG units 200 and a plurality of base stations 300. However, it should be noted that there is no limit to the number of ENG units 200 or base stations 300 in the ENG network 100, and therefore the ENG network 100 may comprises just one ENG unit 200 and/or just one base station 300. As discussed in more detail below, the ENG network 100 (comprising a plurality of base stations 300 in combination with the ENG units 200 and the broadcast station 400) may operate as a point-to-point or point-to-multipoint bi-directional electronic news gathering network.

Figure 2:
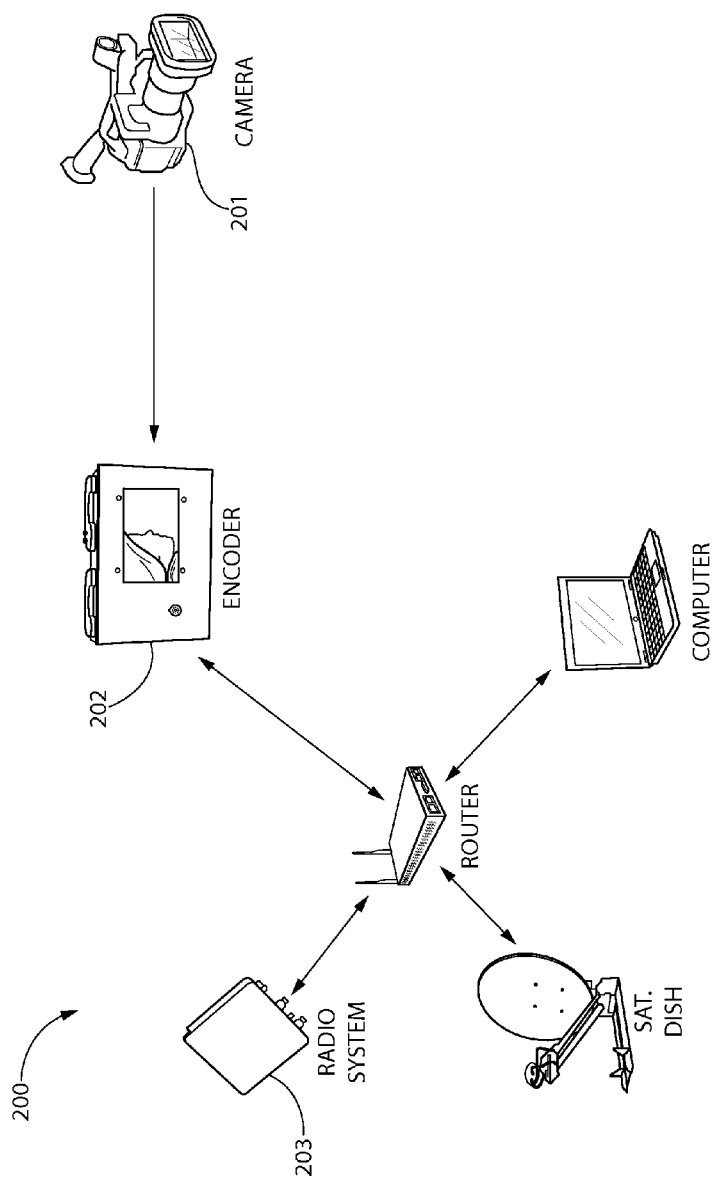
FIG. 2 illustrates a schematic of an ENG unit of an ENG network according to an embodiment of the present invention.

Referring to FIGS. 1-2, two embodiments of an ENG unit 200 according to the present invention are illustrated. As shown in FIG. 1, the ENG unit 200 may be either a mobile or fixed ENG unit 200. Regardless of whether the ENG unit 200 is mobile or fixed, the ENG unit 200 comprises a camera 201, an encoder 202 and a radio system 203. Further, in alternate embodiments, the ENG unit 200 may further comprise a processor, a memory device, a computer, and an interruptible feedback (IFB) system. The computer of the ENG unit 200 is configured to allow for communication with the broadcast station 400, audio/video editing and file transfer. Moreover, the ENG unit 200 may be incorporated into a vehicle, allowing for easy transportation of the ENG unit 200 between locations. It should be noted that all or any number of the components of the ENG unit 200 may be incorporated into a single device or all the components may be separate devices.

Additionally, referring to FIG. 2, an ENG unit 200 may further comprise a satellite dish, or other form of communication equipment required for any of the wireless communication protocols set forth below. The satellite dish of the ENG unit 200 of FIG. 2 is configured to provide a satellite based communication link from the ENG unit 200 to the broadcast station 400, a common carrier network or a base station 300. As discussed in more detail below, if the ENG unit 200 is unable to communicate directly with a base station 300, a secondary communication link, such as a satellite, may be used. A satellite uplink is a more desirable secondary communication link than a 3G/4G cellular connection because the satellite uplink is less likely to be oversaturated by usage due to fewer subscribers than a 3G/4G cellular connection. However, it should be noted that the satellite dish is not required. Moreover, in alternate embodiments, a 3G/4G cellular connection uplink may be provided as a secondary communication link.

The camera 201 of the ENG unit 200 is configured to record a live event at a remote location as a signal. The remote location may be any location that is distant from the broadcast station 400. Typically, in the preferred embodiment, the live event is a newsworthy event that is broadcast to end users by the broadcast station 400. In one embodiment, the signal is a baseband video signal that also comprises recorded audio data from the live event. After recording a live event as a signal, the camera is further configured to transmit the signal to the encoder 202 of the ENG unit 200. The signal may be transmitted as an analog signal or through a serial digital interface (SDI) (or other video communication interface) with the encoder 202. The invention is not so limited and in alternate embodiments, the camera 201 may be replaced with another video source that provides the signal to the encoder 202.

Figure 9:
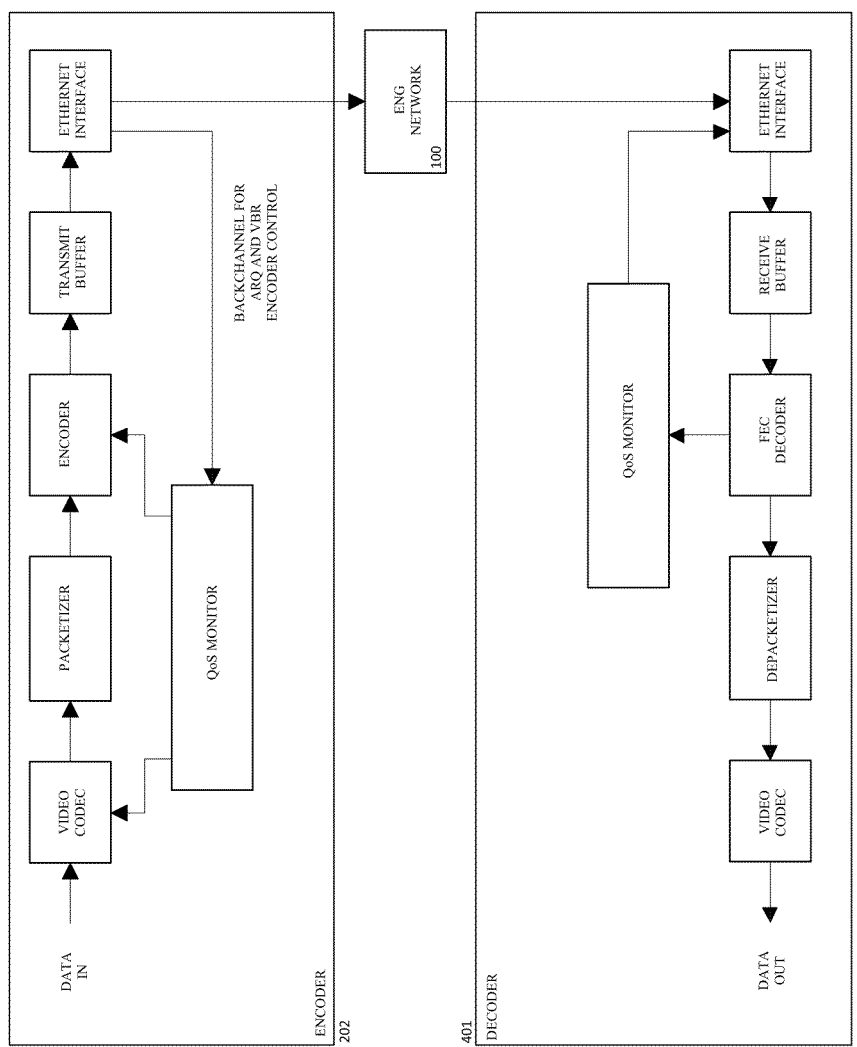
FIG. 9 illustrates an example of an encoder and decoder of an ENG network according to an embodiment of the present invention.

The encoder 202 of the ENG unit 200 is configured to take the analog or digital audio/video signal from the camera 201 or other video source and encode it for transmission via TCP/IP or other protocol. Referring to FIG. 9, an example of an encoder 203 according to an embodiment of the present invention is illustrated. As discussed in more detail below, the encoder 202 comprises a codec, a packetizer, an encoder, a buffer, a Quality of Service (QoS) monitor and a network interface controller (e.g., Ethernet interface). It should be noted that the invention is not so limited, and in alternate embodiments some of the components disclosed in the encoder 202 of FIG. 9 may be omitted.

After receiving a signal from the camera or other video source, the encoder is configured to use a compression algorithm (codec) to compress the signal into a data (or byte) stream. In one embodiment, the compressed data stream is divided into packets by a packetizer and a forward error correction (FEC) algorithm is used to add error correction data to each packet of the data stream. In alternate embodiments, other error correction algorithms may be used on the data stream. For example, FEC algorithms that may be used include, but are not limited to simple XOR, Reed-Solomon, Hamming codes, Fire codes, BCH codes and Tornado codes.

After error correction is added to the data stream, the data stream is then transmitted to the radio system 203. Although preferably using an Ethernet connection, the encoder 202 may transmit the data stream to the radio system 203 via any suitable optical fiber, wired or wireless network interface controller. Further, it should be noted that in alternate embodiments the data stream may first go to a router, a computer and/or editing equipment prior to arriving at the radio system 203. Routing the data stream to a computer or editing equipment prior to transmitting it to the radio system 203 allows for the data stream to be edited and/or additional data to be added to the data stream prior to transmission from the ENG unit 200. Further, as discussed in more detail below, the encoder 202 may further be configured to add prioritization data to the data stream prior to sending it to the radio system 203.

In an alternate embodiment, the encoder 202 may use variable bitrate encoding as well as variable FEC. In such embodiments, if there is not enough bandwidth available on the ENG network 100, then the decoder at the broadcast station 400 can tell the encoder 202 at the ENG unit 200 to throttle back the bitrate that it is using to encode the video. Further, if the decoder receives too many errors in the data stream, then it can tell the encoder 202 to increase the amount of FEC information included in the transmitted data stream. One drawback to increasing the amount of FEC information is that the amount of bandwidth for video data is subsequently reduced, which is why variable bitrate encoding may be beneficial. It should be noted that the increase/decrease of bitrate encoding and FEC information may be done in real-time without operator interference at the ENG unit 200 to ensure QoS.

The radio system 203 of the ENG unit 200 comprises a transmitter and a receiver. The radio system 203 is configured to receive the compressed data stream from the encoder and to transmit the compressed data stream to at least one of the base stations 300. Further, the radio system 300 is further configured to receive network information that may be transmitted from a base station 300 or the broadcast station 400. Stated simply, the radio system 203, is configured to provide for bi-directional data communication between the ENG unit 200 and both the base stations 300 and the broadcast station 400. For example, via the radio system 203, the ENG unit 200 may receive the IP address, default network gateway, DNS server and remote control of either the encoder 202, a base station 300 or the broadcast station 400, or may receive network information from the broadcast station 400 for the assignment of prioritization levels to the data recorded by an ENG unit 200. For example, the bitrate of the encoder 202 of the ENG unit 200 can be changed from the broadcast station 400 without involving the crew in the field. It should be noted that in alternate embodiments, the radio system 203 comprises a transceiver in lieu of a separate receiver and transmitter. In the preferred embodiment, the radio system is a wireless mobile subscriber unit.

It should be further noted that although the encoder 202 is separate from the radio system 203, in alternate embodiments the encoder 202 may be combined with the radio system 203 to reduce the amount of equipment involved as well as make the ENG unit 200 more portable.

The transmission of data from the radio system 203 of an ENG unit 200 to a base station 300 may be accomplished using any one or any combination of the following wireless technologies: a common carrier mobile cellular network, a Wi-Fi network, a public WiMax network, a private WiMax network, a VSAT, a BGAN or a satellite network. In the preferred embodiment of the present invention, the transmission of data from an ENG unit 200 to a base station 300 is accomplished using the WiMax protocol over an all-digital, private WiMax network.

Further, in the preferred embodiment of the present invention, the ENG network 100 of the present invention is configured so that data steams comprising both the recorded video and audio data may be transmitted from a remote ENG unit 200 back to the broadcast station 400 as a single data stream using a single transmitter or modem. Therefore, video and audio data may be recorded at a remote location by an ENG unit 200 and transmitted back to the broadcast station 400 without having to break up or segment the data streams into a plurality of data streams each having to be transmitted by a separate transmitter. Stated simply, the ENG network 100 may be configured so that ENG units 200 are allocated sufficient bandwidth so that they may transmit video and audio data back to the broadcast station 400 without having to break up or segment the data streams. Further, it should be noted that the ENG network 100 of the present invention is capable of such transmission of data substantially in real-time for the broadcast of live events.

In the preferred embodiment, the all digital private WiMax network is at least a portion, if not the entirety, of the ENG network 100 described herein. Therefore, in the preferred embodiment, at least a portion (if not the entirety) of the ENG units 200 are configured to receive and transmit data using the WiMax protocol. However, it should be noted that there is no limit to the number of protocols each ENG unit 200 and base station 300 may be configured to use for data communication across the ENG network 100. Ideally, each ENG unit 200 is configured to transmit and receiver data using more than one wireless protocol.

In one embodiment, the entirely of the ENG network 100 is an all-digital, private WiMax network designed and created specifically by a broadcast company for ENG data communication. However, as noted above, the ENG network 100 may comprise base stations 300 that are configured to transmit data using a wireless protocol other than WiMax. If the ENG network 100 comprises portions that are part of an all-digital, private WiMax network, then the data recorded by the ENG units 200 may be transmitted to the broadcast station 400, via base stations 300 that are part of the all-digital, private WiMax network, without having to break up or segment the data stream into a plurality of data streams each having to be transmitted by a separate transmitter. Further, if the ENG network 100 comprises a private network (whether it be WiMax or another protocol), then the broadcast company has greater control over the transmission of data, including the ability to prioritize data streams from specific ENG units 200. As discussed in more detail below, the prioritization of data streams across the ENG network 100 allows the broadcast company to better ensure the reception of breaking news events. This may be especially important in situations where many different broadcast companies are all trying to transmit data regarding a particular event at the same time from the same place.

As noted above, if the entire ENG network 100 is not the private WiMax network, then the additional base stations 300 may be part of a common carrier cellular service, a satellite dish, or any other communication network known in the art. Further, it should be understood that in alternate embodiments, the ENG network 100 may comprise some ENG units 200 and base stations 300 communicate using the WiMax protocol over a private WiMax network, while other ENG units 200 and base stations 300 only communicate using different wireless protocols. Additionally, the invention is not so limited, and the ENG network 100 of the present invention may comprise private networks that communicate using protocols other than WiMax.

Therefore, the ENG network 100 of the present invention is not limited to the type or types of wireless communication protocols used. In the preferred embodiment, the ENG network 100 comprises WiMax enabled base stations 300 acting as a backbone for the ENG network 100, while additional base stations 300 that use different wireless communication protocols may be used along the peripheral of the ENG network 100, thereby expanding its scope. Stated simply, a portion or the entirety of the ENG network 100 can be an all digital private network (preferably WiMax) configured specifically for use by a specific broadcasting company, therefore allowing for the prioritization of the transmission of data across the ENG network 100 (discussed in detail below).

Still referring to FIG. 1, a base station 300 according to one embodiment of the present invention is illustrated. The base station 300 comprises a radio 301, a processor (not shown), a memory device (not shown), at least one antenna (not shown), and an authentication, authorization and accounting (AAA) database (not shown). Further, in alternate embodiments, the base station 300 may further comprise a global positioning system (GPS) for synchronization of transmitters/receivers. It should be noted that in alternate embodiments the AAA database may be built into a server at the broadcast station 400. As noted above, although there is only one base station 300 illustrated in FIG. 1, there is no limit to the number of base stations 300 in the ENG network 100. In the preferred embodiment, the ENG network 100 comprises a plurality of base stations 300. Each base station 300 is configured to receive and transmit data from ENG devices 200 and the broadcast station 400. Further, as discussed in detail below, the base stations 300 are further configured to route data received from a plurality of different ENG units 200. For example, if a priority level is assigned to a data stream received by the base station 300 from an ENG unit 200, the base station routes the data based on the data stream's priority level. In one embodiment and as discussed in more detail below, the base stations 300 of the present invention are further configured to add priority level information to a received data stream, if the data stream does not comprise priority level information.

The radio 301 of the base station 300 comprises a transceiver configured to transmit and receive data wirelessly to and from one or a plurality of ENG units 200. As noted above, a base station 300 may communicate with an ENG unit 200 only via the WiMax protocol, communicate via the WiMax protocol and other protocols, or communicate only via other protocols (such as common carrier cellular networks or a satellite communication protocol). After receiving a data stream from an ENG unit 200, the radio 301 of the base station 300 is configured to transmit the data stream to the broadcast station 400. In the preferred embodiment, the base station 300 communicates with the broadcast station 400 through wire Ethernet connections; however it should be noted that the invention is not so limited, and a base station 300 may communicate back to the broadcast station 400 using any optical fiber, wired or wireless network interface. Further, as discussed in detail below, the ENG network 100 may further comprise a backhaul data link 500 that routes the data from a base station 300 back to a broadcast station 400.

Further, it should be noted that a base station 300 may communicate with more than one ENG unit 200 at a single time. For example, in one embodiment, a base station 300 may support communication with multiple ENG units 200 at the same time using a scheduling algorithm. In such an embodiment, when the ENG unit 200 connects to a base station 300, it is assigned transmit and receive slots, which may be adjusted in real-time by the base station 300 depending on the QoS rules. Therefore, the ENG network 100 (comprising a plurality of base stations 300 in combination with the ENG units 200 and the broadcast station 400) may operate as a point-to-point or point-to-multipoint bi-directional ENG network.

Prior to the radio system 203 of an ENG unit 200 transmitting data to at least one base station 300, the radio system 203 must first register with a base station 300 within its transmission range. When the radio system 203 is powered on, the radio system 203 attempts to register with at least one of the plurality of base stations 300 of the ENG network 100. The radio system 203 may be configured to scan a preset list of frequencies or it may scan the entire band to find a base station 300 within its transmission range. Once the radio system 203 locates a base station 300 within its transmission range, the radio system 203 transmits a registration request to the base station 300 in order to set up an initial communication link. Upon the base station 200 receiving the registration request from the radio system 203, the base station 200 searches an AAA database to determine if the media access control (MAC) address of the radio system 203 is authorized to connect to the ENG network 100 of which the base station 300 is a part. If the base station 300 finds the MAC address of the radio system 203, and thus the ENG unit 200, the base station 300 reserves transmit and receive slots for the radio system 203.

A base station 300 is further configured to send Medium Access Protocol (MAP) commands to an ENG unit 200. The commands provide the ENG unit 200 with information about which upload slots of the base station 300 the ENG unit 200 it may use when transmitting data. Depending on the number and priority of ENG units 200 in communication with a base station 300, the base station 300 can provide an ENG unit 200 with more upload slots depending on the priority level of the data stream being received, the quality of service (QoS) rules that have been defined, and the amount of traffic utilization of the base station 300. However, it should be noted that the invention is not so limited, and in alternate embodiments of slot allocation protocols may be used.

After a base station 300 receives the uploaded data stream from an ENG unit 200, the base station 300 uses an error detection algorithm to determine if each frame of the data stream was received correctly. If an error is detected, the base station will attempt to use the error correction algorithm data (e.g., FEC data) to correct the frame. If correction is not possible, the base station 300 sends the transmitting ENG unit 200 a request to resend the frame. If the frames of the data stream are received correctly, the base station 300 assembles the frames into packets. The packets of the data stream are then transmitted by the radio 301 to the broadcast station 400. If the base station 300 is not located at the broadcast station 400, the packets from the base station 300 are sent to a backhaul radio 500 and then to the broadcast station 400.

In the preferred embodiment, the base stations 300 are terrestrial, non-mobile units. However, it should be understood that in alternate embodiments a base station 300 may be a satellite or other non-terrestrial unit. Further, in other alternate embodiments, a base station 300 may be a mobile terrestrial unit that allows for on-the-fly expansion of the ENG network 100.

Further, as shown in FIG. 1, the ENG network 100 may further comprise a backhaul data link 500. The backhaul data link 500 comprises at least one backhaul radio and is configured to receive data from any one of the base stations 300 and route the data to the broadcast station 400. In alternate embodiments, the backhaul data link 500 may be fiber or other leased telecom lines. Stated simply, the backhaul data link 500 provides for a bi-directional data link from the broadcast station 400 to at least one base station 300. The backhaul radio of a backhaul data link 500 may comprise a transceiver and a router. In the preferred embodiment, the backhaul radio comprises a WiMax radio. However, the invention is not so limited, and in alternate embodiments, the backhaul radio may be any other sort of radio or wireless communication device.

In one embodiment, the backhaul data link 500 may comprise two backhaul radios, one radio located at a location remote from the broadcast station 400 and a second located at the broadcast station 400. Further, as noted above, the backhaul data link 500 may comprise fiber or other leased telecom lines. In embodiments that comprise two backhaul radios, the remote radio may be desirable because it can be placed in a location proximate to a base station 300 and allow for a data connection from the base station 300 directly back to the backhaul radio located at the broadcast station 400. However, the invention is not so limited and in alternate embodiments the backhaul data link 500 may be omitted if the base station 300 is located at the broadcast station 400. Further, it should be noted that there is no limit to the number of backhaul data links 500 used in the ENG network 100 of the present invention.

Finally, the ENG network 100 comprises a broadcast station 400. The broadcast station 400 comprises a transceiver, a switch, a router, and a decoder 401. Further, the broadcast station 400 may further comprise a selection mechanism 700, a local area network (LAN), a video server, editing equipment, a newsroom computer system (NRCS), a Voice over Internet Protocol (VoIP) phone and intercom system, and a station router or production switcher. The transceiver of the broadcast station 400 may be the backhaul radio 501 of the backhaul data link 500. The broadcast station 400 is configured to transmit and receive data to and from the ENG units 200 via at least some of the base stations 300.

The data packets from the base station 300 or backhaul radio 500 are received by a router at the broadcast station 400. The router uses the destination IP in the packet header to determine where to route the packet. In the case of live video, the destination IP will usually be that of the decoder 401.

Referring to FIG. 9, an example of a decoder 401 according to an embodiment of the present invention is illustrated. The decoder 401 comprises a network interface controller (e.g., Ethernet interface), a buffer, a decoder, a depacketizer, a codec and a QoS monitor. It should be noted that the invention is not so limited, and in alternate embodiments some of the components disclosed in the decoder 202 of FIG. 9 may be omitted. The decoder 401 of the broadcast station 400 receives the data packets from the station network and uses a video decompression algorithm (codec) to decode the video. If the decoder 401 detects errors in the data, it will attempt to correct the error by using the FEC data that has been included in the relevant data packet. If the decoder 401 is unable to correct the problem, it may request that the encoder 202 of the ENG unit 200 resend the relevant packet or it may use a concealment technique such as freezing the picture or muting the audio. The decoded data packets are converted to baseband video which can then be connected to the station video router or directly to a production switcher. The broadcast station 400 is then configured to broadcast the data stream transmitted by an ENG unit 200.

It should be noted that the transmission of an audio/video signal recorded by an ENG unit 200 to the broadcast station 400 can be done in substantially real-time, thereby enabling the live broadcast of news events from remote locations within the ENG network 100.

Figure 3:
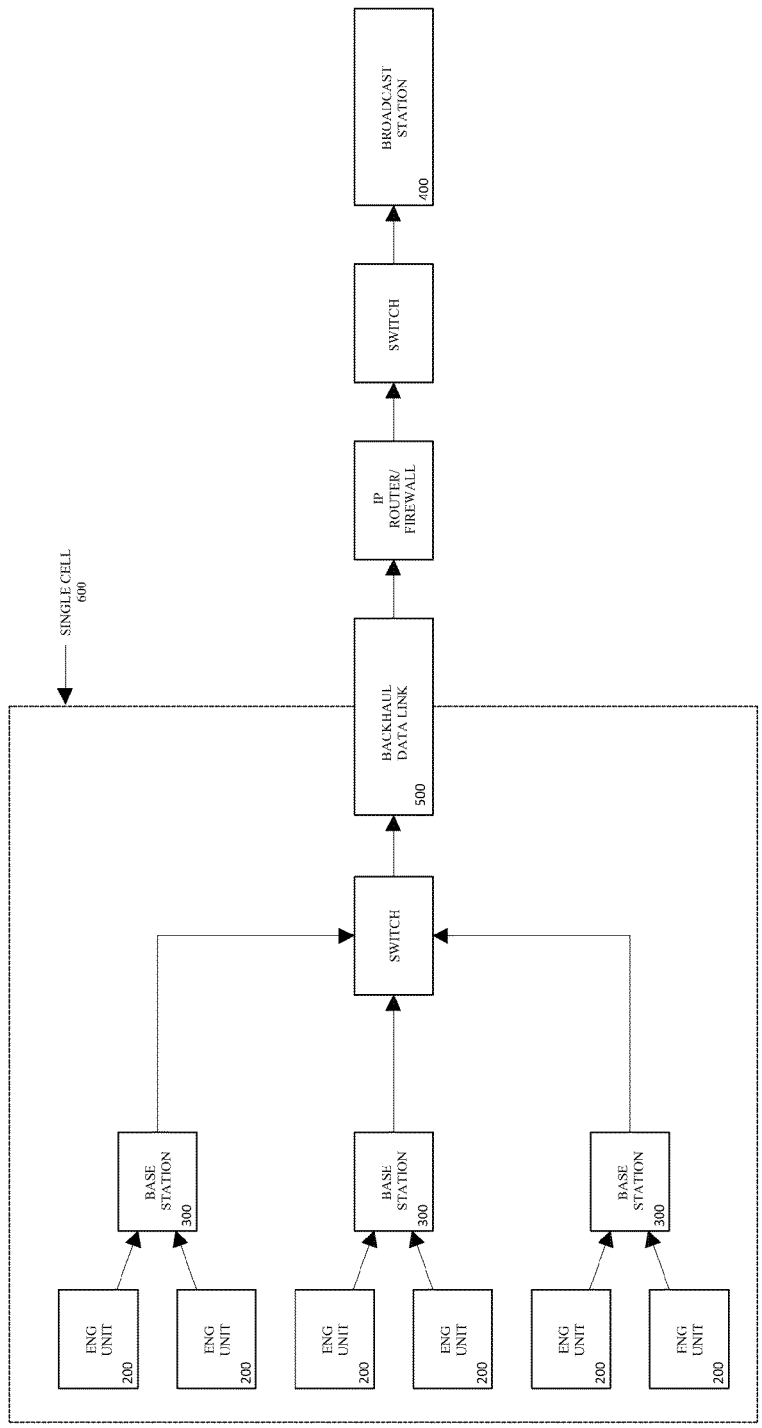
FIG. 3 illustrates a schematic of a cell of base stations of an ENG network according to an embodiment of the present invention.

Referring to FIG. 3 and as noted above, the ENG network 100 of the present invention is not limited to the number or ENG units 200, base stations 300 or backhaul data links 500. However, it should be further noted that the ENG network 100 of the present invention is not limited to the number of cells 600 it comprises. A cell 600 is at least one base station 300 (preferably a plurality of base stations 300) that is connected to a single backhaul data link 500 that provides direct data communication with the broadcast station 400. Further, the cell 600 may be defined to further include the particular ENG units 200 that currently are in communication with its base stations 300. However, as noted above, some ENG units 200 are mobile and therefore could move out of communication range from the base stations 300 of a particular cell 600. Additionally, as shown in FIG. 3, if the cell 600 comprises more than one base station 300, the cell 600 may further comprise a switch that enables the backhaul data link 500 to effectively communicate and route data from the plurality of base stations 300. The switch is configured to aggregate the Ethernet connections from the base stations 300 to feed into a backhaul data link 500. It the preferred embodiment, the switch is a layer 3 switch capable of prioritizing traffic.

Figure 4:
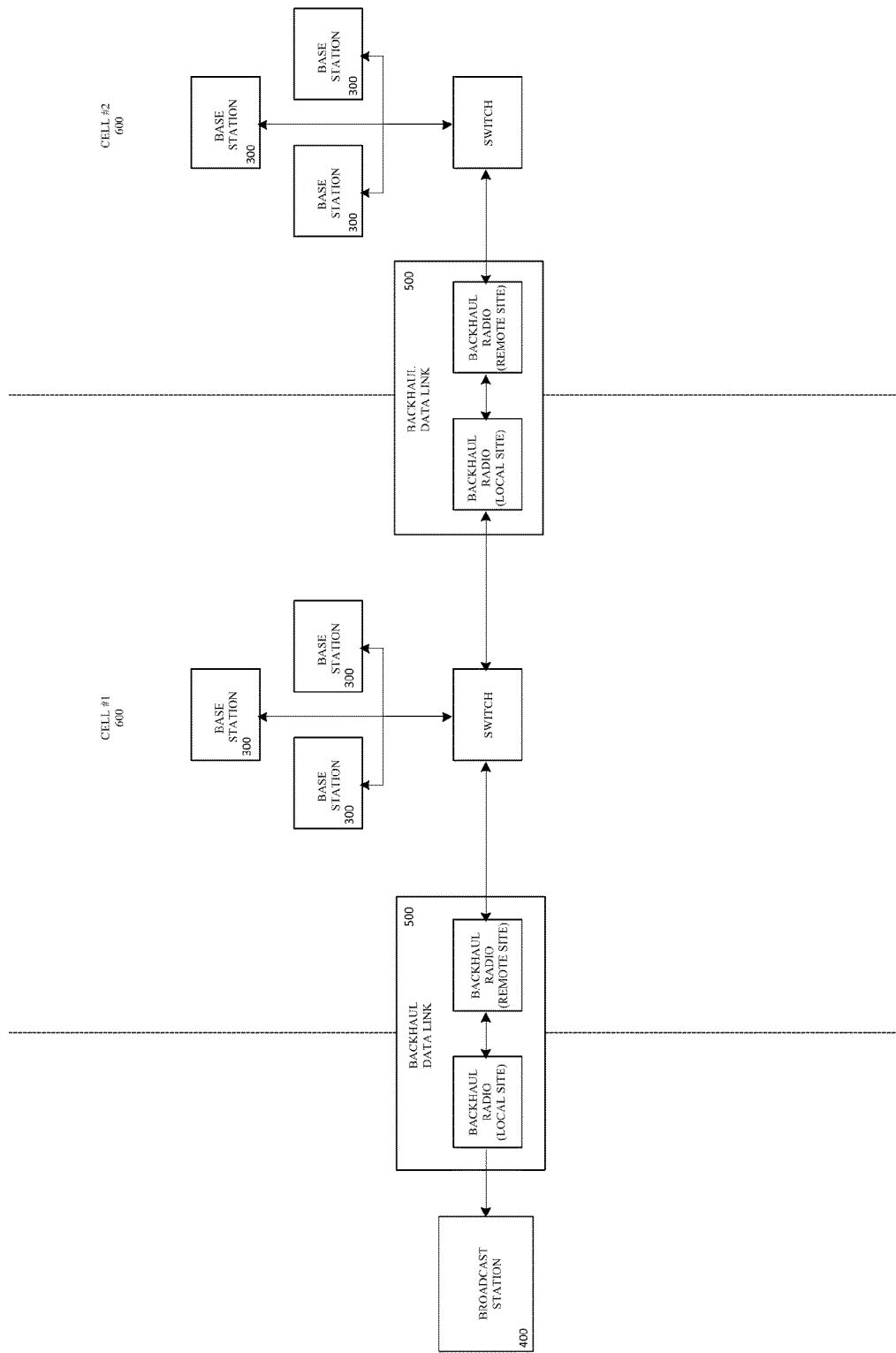
FIG. 4 illustrates an example of an ENG network that comprises more than one cell in a daisy-chained configuration according to an embodiment of the present invention.
Figure 5:
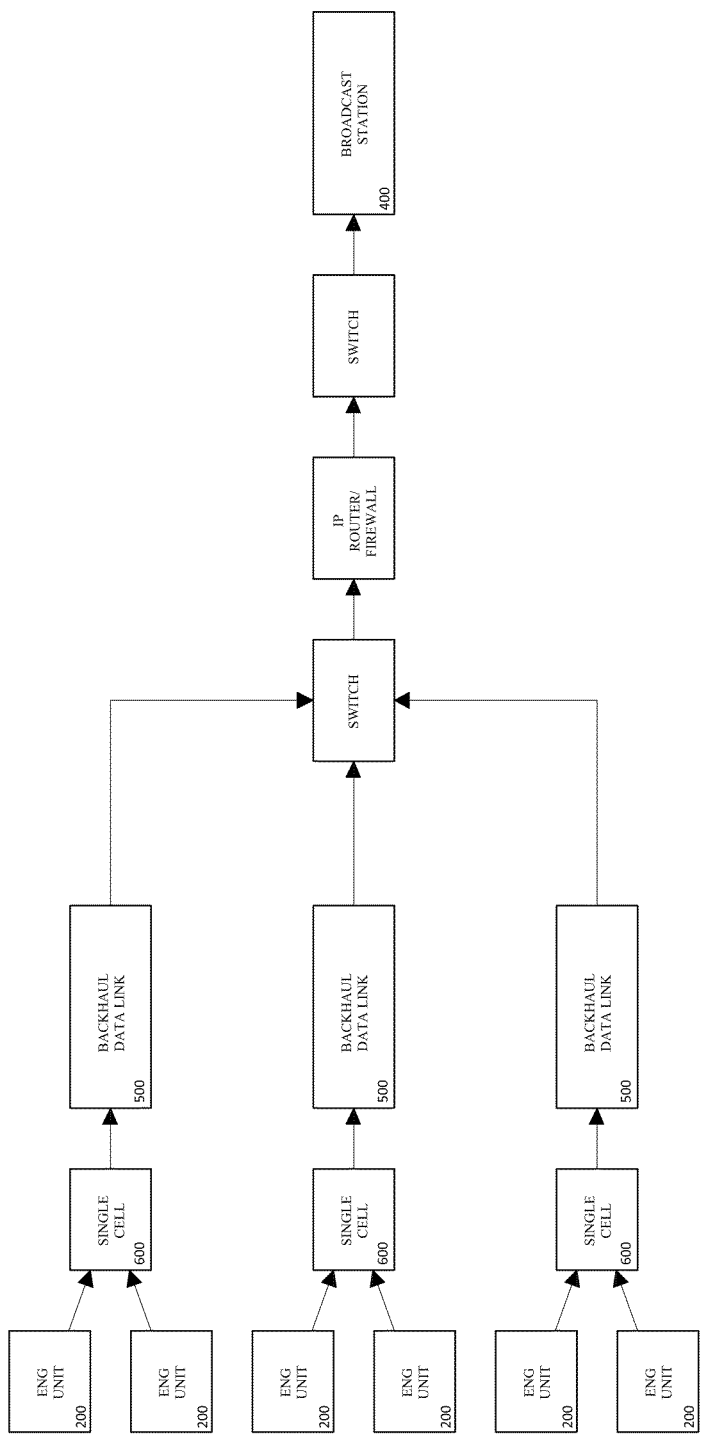
FIG. 5 illustrates another example of an ENG network that comprises more than one cell according to an embodiment of the present invention.

Referring to FIGS. 4 and 5, examples of an ENG network 100 that comprises more than one cell 600 according to embodiments of the present invention are illustrated. As shown in FIG. 4, the ENG network 100 of the present invention may comprise more than one cell 600 of base stations 300, and a particular cell 600 may be daisy-chained to another cell 600. Further, as discussed below with reference to FIG. 5, the ENG network 100 may comprise multiple cells 600 to allow for a more expansive coverage area for data communication back to the broadcast station 400. It may be advantageous to have one cell 600 of base stations 300 of the ENG network 100 daisy-chained to a second cell 600. For example, it would be advantageous if it would not otherwise be feasible to have the second cell 600 of base stations 300 communicating directly with the broadcast station 400 due to the locations of the bases stations 300 of the second cell 600. For example, in FIG. 4, cell #2 600 may be too far and/or may not have a direct communication path back to the broadcast station 400. To solve this problem, cell #2 600 may be daisy-chained to cell #1 600, thereby providing cell #2 600 with a communication path back to the broadcast station 400. It should be noted that although only two cells 600 are illustrated as daisy-chained in FIG. 4, the invention is not so limited and the ENG network 100 of the present invention may comprise any number of cells 600 daisy-chained together.

Referring to FIG. 5, a multi cell 600 configuration of an ENG network 100 according to one embodiment of the present invention is illustrated. As shown in FIG. 5, the ENG network 100 of the present invention may comprise more than one cell 600 of base stations 300, whereby each cell 600 has its own backhaul data link 500 that provides for direct communication back to the broadcast station 400. As noted above, after an ENG unit 200 transmits a data stream to a base station 300 within a single cell 600, that base station 300 provides the data stream to a backhaul link 500 associated with that cell 600 and ultimately routes the data back to the broadcast station 400. It may be advantageous to have more than one cell 600 of base stations 300 if each cell 600 covers an area that is remote from the other cells 600. Therefore, the ENG network 100 of the present invention may have multiple different cells 600, each cell covering its own general area, without requiring direct communication between each oldie cells 600. It should be noted that although only three cells 600 are illustrated in FIG. 5, the invention is not so limited and the ENG network 100 of the present invention may comprise any number of cells 600, wherein each cell 600 may comprise any number of base stations 300 and/or ENG units 200.

In an alternate embodiment, the cells 600 of the ENG network 100 may further be configured in a mesh network orientation to provide resiliency to the network 100. In mesh network orientation, each cell 600 would be configured to transmit data to another cell 600 within the ENG network 100 in order to transmit its data back to the broadcast station 400.

The mesh network orientation is beneficial because it would ensure that data may be transmitted from a cell 600 even if that cell's backhaul data 500 link were to fail.

As noted above, the ENG network 100 of the present invention is further configured to transmit data in accordance with prioritization rules. In order to provide low latency, low jitter and low loss routing of data packets from the encoder 202 of an ENG unit 200, each ENG unit 200 is further configured to prioritize the data streams prior to their transmission across the ENG network 100.

In one embodiment, Quality of Service (QoS) rules are utilized to prioritize the traffic between data streams and all other traffic. Specifically, the data streams comprising video data are placed ahead of all other traffic being sent by the ENG units 200. This is important for an ENG network 100 because the transmission of audio/video data for broadcast during live television is paramount to the broadcast company.

Figure 6:
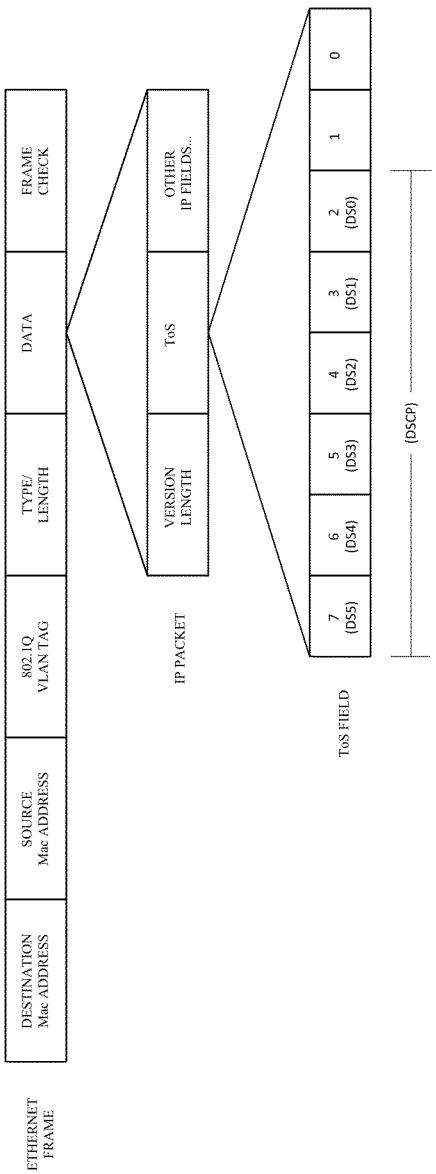
FIG. 6 illustrates an example of a data frame in accordance with an embodiment of the present invention.

Referring to FIG. 6, an illustration of a data frame in accordance with an embodiment of the present invention is illustrated. According to one embodiment of the present invention, the prioritization of data is achieved by marking the packets of data with a Differentiated Service's Code Point (DSCP) value. In the preferred embodiment, the DSCP value of a data stream is marked by the encoder 202 of the ENG unit 200. However, it should be understood that in alternate embodiments the DSCP value of a data stream may be marked by a base station 300 or by a selection mechanism 700 (discussed in more detail below). When a base station 300 receives a frame of a data stream marked with a DSCP value that it recognizes as being high priority, it will over more upload/download slots to the ENG unit 200 thus providing greater data throughput. For example, if an ENG unit 200 is recording live audio/video data and attempting to transmit the live audio/video data back to the broadcast station 400 in real-time, then it is important that the base station 300 that receives the data from the ENG unit 200 and transmit the data over any other data it may be trafficking on the ENG network 100. Therefore, the ENG unit 200 can better ensure that the audio/video feed it is transmitting across the ENG network 100 will arrive quickly at the broadcasting station 400.

As noted above, in one embodiment, the encoder 202 of the ENG unit 200 prioritizes the data streams using the differentiated services (DS) field located in IP header of the data streams to implement QoS. In alternate embodiments, the switch, router, or radio of the ENG unit 200 may be configured to prioritize the data. However, if the ENG unit 200 originating the data stream does not support the prioritization of the data stream, then a base station 300 subsequently receiving the data stream may prioritize the data stream using the differentiated services (DS) field located in IP header of the data stream. Routers and switches throughout the entire network use the DSCP field located in the DS field to determine the per-hop behavior (PHB) that the router or switch will use when forwarding the packet. According to one embodiment of the present invention, substantially all data residing on the ENG network 100 may be broken into three general priority levels: expedited forwarding (EF), assured forwarding (AF) and default or best effort forwarding. However, the invention is not so limited, and in alternate embodiments the data of the ENG network 100 may be broken down using different prioritization schemes and priority levels.

In an alternate embodiment, the data within the ENG network 100 may be prioritized by a class based classification. A class based classification prioritization method could set up queues within all the equipment of the ENG network 100 so that if a router/switch received data destined for a specific IP address and/or TCP/IP port, the router/switch will transmit that data first before handling traffic that does not meet that classification rule. In the class based classification prioritization method none of the data packets are marked and the queues and classification rules need to be set up at each pieces of equipment in order to ensure prioritization of data across the entire ENG network 100.

According to one embodiment of the present invention, audio/video data in the network is marked for expedited forwarding (EF) by using the DSCP value of 46. Routers within the network will route marked EF marked (or queued) data before routing data in other transmit queues. Further, network control data is marked with DSCP value 30 for assured forwarding (AF). Data marked as network control is given priority over routine data, but does not take precedence over EF marked data. Network control data includes but is not limited to data used to remotely control the radio system 203 and encoder 202 of the ENG units 200. Finally, routine data is marked with DSCP value 0 for best effort forwarding. If a network link is saturated, routine data will be dropped first before network control and EF marked data is dropped. Routine data encompasses all data that does not involve audio/video data or network control data. It should be noted that the invention is not limited to the specific DSCP values listed above, and therefore any DSCP values may be assigned to prioritize the data on the network 100.

If the data stream is not classified or prioritized at the ENG unit 200, then the data is classified by a set of rules defined in the router configuration of a base station 300. If the data matches a certain set of rules, that data is then marked with a specific DSCP value. Rules may match data based on a variety of parameters including: (1) Destination IP and Port, (2) Source IP and Port, (3) VLAN Tag and (4) Protocol. It should be understood that the invention is not so limited and any number of other parameters may be used by the rules to match the data to a priority level.

Figure 7:
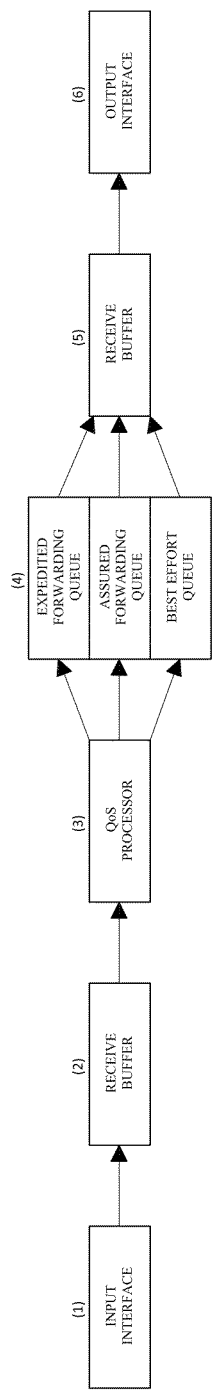
FIG. 7 illustrates the typical flow of data through a router or other Differentiated Services Code Point (DSCP) aware device of a base station, a backhaul data link or the broadcast station according to an embodiment of the present invention.

Referring to FIG. 7, the typical flow of data through a router or other DSCP aware device of a base station 300, a backhaul data link 500, the broadcast station 400, or any other DSCP aware device on the ENG network 100 according to an embodiment of the present invention is illustrated. For example, it should be noted that the ENG network 100 of the present invention is not limited to the number or types of DSCP aware devices on the network. The traffic (data stream) is received via the input interface (1), which could be an optical fiber, wired or wireless Ethernet interface, and is buffered in the receive buffer (2). The QoS processor (3) takes buffered data from the receive buffer and sorts the data into different QoS queues (4) based upon the DSCP value. If a DSCP value is not present and rules have been configured, the QoS processor marks traffic based upon traffic classification rules (parameters) set forth above. Data is moved from the interface queues (4) to the transmit buffer (5) based on the priority of the traffic. Data marked for expedited forwarding (EF) takes precedence, followed by assured forwarding (AF), and finally best effort (BE). Finally the output interface (6), which can be an optical fiber, wired or wireless interface, transmits the data from the transmit buffer to the next device in the ENG network 100.

Figure 8:
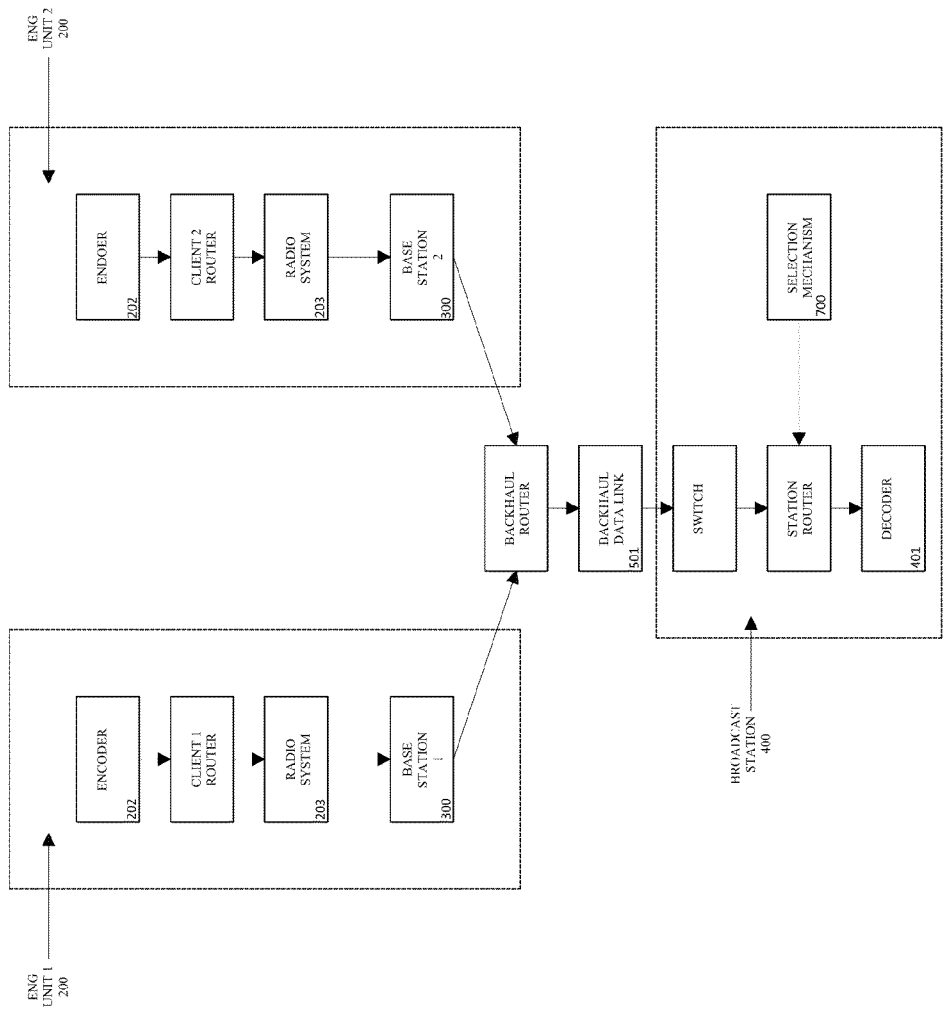
FIG. 8 illustrates a scenario where a selection mechanism controls the transmission of data from two ENG units that go through two separate base stations that share a common backhaul link back to the decoder at the broadcast station according to an embodiment of the present invention.

Referring to FIG. 8 and as noted above, the ENG network 100 of the present invention may further comprise a selection mechanism 700. In the preferred embodiment, the selection mechanism 700 is located at the broadcast station 400 and is connected to the broadcast station router. However, in alternate embodiments, the selection mechanism may be located in the field, such as at an ENG unit 200, so that live ENG units 200 could elect themselves as being high priority traffic.

The selection mechanism 700 is configured to allow a broadcast operator to select, in real-time, a specific ENG unit 200 on the ENG network 100 to be set to the highest priority level and to set all other ENG units 200 to a lower priority level. Upon the operator of the selection mechanism 700 choosing an ENG unit 200 to prioritize, the selection mechanism 700 transmits network control information to all routers, all switches, all base stations 300 and all ENG units 200 in the ENG network 100. The network control information changes the traffic classification rules so that the audio/video data originating from the selected ENG unit 200 is marked for expedited forwarding while traffic from all other ENG units 200 is marked for either assured forwarding or best effort. Therefore, the selection mechanism 700 allows an operator to select and prioritize a specific ENG unit 200 over all other ENG units 200 on the ENG network 100 so that the data transmitted by the selected ENG unit 200 is prioritized above all other traffic on the ENG network 100. Further, it should be noted that the selection mechanism 700 changes the traffic classification rules on the ENG network 100 substantially in real-time. This may be beneficial if the broadcast operator would like to broadcast a live data (audio/video) feed from a specific ENG unit 200 in real-time during a newscast. The selection mechanism 700 allows the operator a simple and easy way to ensure that the data recorded and transmitted from a specific ENG unit 200 is prioritized over all other data on the ENG network 100 and can therefore be broadcast in real-time.

The selection mechanism 700 is especially important in situations where the broadcast station 400 may have more than one ENG unit 200 located at the same location, each ENG unit 200 simultaneously recording and transmitting video and audio data of an event back to the broadcast station 400. However, if two or more ENG units 200 try to send data comprising audio/video data back over the same backhaul data link 500, there may not be enough bandwidth available. If all of the sending ENG units 200 are marking their data for expedited forwarding, the routers may become congested since they will not know which traffic to drop and which to prioritize. To prevent this, the selection mechanism 700 can be used to determine which ENG unit 200 gets priority at any given time.

In alternate embodiments, the selection mechanism 700 can further be configured to send commands to the video decoder at the broadcast station 500 to control and/or prioritize the decoding of data received from various ENG units 200. For example, the selection mechanism 700 may be configured to send a command to the decoder to select a specific ENG unit 200 so that only the data sent by that specific ENG unit 200 is decoded by the decoder at the broadcast station 500.

Still referring to FIG. 8, a scenario where two ENG units 200 are going through two separate base stations 300 that share a common backhaul link 500 back to the decoder 401 at the broadcast station 400 according to an embodiment of the present invention is illustrated. If the backhaul data link 500 is only capable of handling 20 Mb/s of traffic and each ENG unit 200 is sending out audio/video data streams encoded at 15 Mb/s and marked for expedite forwarding, the backhaul router does not know which traffic it should forward over the backhaul data link 500 first.

To solve this problem, the selection mechanism 700 may be used to allow an operator to select in real-time which ENG unit 200 should have priority. This may be accomplished by the operator selecting an ENG unit 200 from a user interface of the selection mechanism. The user interface may be a hardware control panel with a button for each ENG unit 200, or it may be a computer program which has a graphical user interface (GUI) with a button for each ENG unit 200. It should be noted that the user interface of the selection mechanism 700 of the present invention is not limited to the embodiments described here, and any user interface known in the art may be used in accordance with the principles of the selection mechanism 700 described herein. When the operator selects an ENG unit 200, the live selection mechanism sends out network control information to all routers, all base stations 300 and all ENG units 200 in the ENG network 100 changing traffic classification rules so that the audio/video data originating from the selected ENG unit 200 would be marked for expedited forwarding while traffic from all other ENG units 200 would be marked for either assured forwarding or best effort. Therefore, data transmitted by the selected ENG unit 200 has priority over all the other traffic on the ENG network 100, thereby best ensuring a successful live broadcast from the selected ENG unit 200. Further, since the selection mechanism 700 works in real time, the data transmitted by the selected ENG unit 200 can be received and broadcast in real-time by the broadcast station 400.

For example and still referring to FIG. 8, two ENG units 200 are dispatched for live shots for the 5 p.m. newscast. The two ENG units 200 will be using the same wireless cell and backhaul data link. ENG unit 2 will be first in the newscast followed by ENG unit 1. An operator at the station selects ENG unit 2 using the selection mechanism 700 to give ENG unit 2 priority. The selection mechanism 700 sends out network control information to all routers, all base stations 300 and all ENG units 200 instructing them to change their traffic classification rules so that all audio/video traffic from ENG unit 2's IP address should be marked for expedited forwarding while traffic from all other ENG units 200 should be marked for best effort forwarding. After ENG unit 2 is done with its live shot, the station operator selects ENG unit 1 using the selection mechanism 700 to give ENG unit 1 priority. The selection mechanism 700 sends out network control information to all routers, all base stations 300 and all ENG units 200 instructing them to change their traffic classification rules so that all audio/video traffic from ENG unit 1's IP address would be marked for expedited forwarding while traffic from all other ENG units would be marked for best effort forwarding. Therefore, the data recorded and transmitted by ENG unit 1 may be received and broadcasted by the broadcast station 400 in real-time during the airing of the 5 p.m. newscast.

It should be noted that in alternate embodiments, although video traffic may be marked for expedited forwarding, any remaining bandwidth available in the ENG network 100 may be used for the transmission and receipt of other data. For example, such other purposes may include, but are not limited to reporters and field personnel checking their email and/or entering scripts into the newsroom computer system (NRCS). Further, this data may be marked as best effort since this type of traffic does not require low latency and low jitter.

Moreover, in another alternate embodiment the extra bandwidth could also be used in times of emergencies by public safety agencies to disseminate emergency information such as issuing Emergency Alert System (EAS) alerts. In one embodiment, EAS alerts may be issued by remotely controlling an EAS encoder/decoder located at the broadcast station, or alternatively by submitting alerts to a Common Altering Protocol (CAP) server via an available Internet connection at the broadcast station 400. In such embodiments, a laptop or other computer could be connected directly to a subscriber unit to provide the laptop or other computer with the necessary data services. Moreover, it should be noted that the transmission of EAS alerts may be prioritized for distributors or first responders so to take precedence over other data residing on the ENG network 100.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A method of remotely uploading recordings of live events from remote locations to a broadcast station comprising:
   a) recording live events at remote locations using a plurality of electronic news gathering (ENG) units, each of the live events being recorded by one of the ENG units as a signal including both audio and video data;
   b) each of the ENG units encoding the signal into a data stream;
   c) assigning a priority level to each of the data streams;
   d) transmitting the data streams of the ENG units to the broadcast station through at least one base station, wherein the data streams are wirelessly transmitted from the ENG unit to the at least one base station and transmitted from the at least one base station to the broadcast station, wherein the transmission of the data streams is prioritized based on the assigned priority levels, and wherein a first ENG unit of the plurality of ENG units is configured to mark a first data stream encoded by the first ENG unit with a priority level indicator based on the assigned priority levels; and
   e) receiving and decoding the data streams at the broadcast station.

2. The method of claim 1 where the priority level of each of the data streams is assigned using a differentiated services (DS) field and a differentiated services code point (DSCP) field in each data stream.

3. The method of claim 1 wherein the assignment of the priority level to each of the data streams is based on parameters, the parameters comprising (i) Destination IP and Port, (ii) Source IP and Port, (iii) VLAN Tag, and (iv) Protocol.

4. The method of claim 1 wherein the priority level of each of the data streams is one of (i) expedited forwarding, (ii) assured forwarding or (iii) best effort forwarding.

5. The method of claim 1 wherein the priority level of each of the data streams is assigned by each of the ENG units.

6. The method of claim 1 wherein the priority level of each of the data streams is assigned by a base station of the at least one base station.

7. The method of claim 1 wherein the priority level of each of the data streams is assigned by a selection mechanism, the selection mechanism configured to allow an operator to prioritize the transmission of each of the data streams.

8. The method of claim 7 further comprising step f) prior to step c), step f) comprising:
   transmitting network control information with the selection mechanism to the plurality of ENG units and the at least one base station, the network control information assigning the priority level to each of the data streams.

9. The method of claim 8 wherein the network control information changes the priority level of a first data stream from a first ENG unit of the plurality of ENG units to expedited forwarding and the priority level of remaining data streams of remaining ENG units of the plurality of ENG units to either assured forwarding or best effort forwarding, thereby ensuring that the first data stream has the highest priority level of the data streams.

10. The method of claim 1 wherein the at least one base station is part of at least one of the following: a mobile cellular network, a Wi-Fi network, a public WiMax network, a private WiMax network, a VSAT, a BGAN and a satellite network.

11. The method of claim 1 wherein each of the data streams comprises audio and video data.

12. The method of claim 1 wherein the broadcast station receives the data stream substantially in real time.

13. The method of claim 1 wherein each of the data streams are sent as single data streams from the plurality of ENG units to the broadcast station.

14. An electronic news gathering (ENG) network comprising:
   a plurality of ENG units, each ENG unit comprising a camera, an encoder and a transceiver, each of the ENG units configured to: (1) record a live event at a remote location as a signal including both audio and video data, (2) encode the signal as a data stream, and (3) wirelessly transmit the data stream to at least one base station;
   the at least one base station comprising a transceiver, the at least one base station configured to: (1) receive each of the data streams from the plurality of ENG units; and (2) transmit each of the data streams to the broadcast station;
   the broadcast station comprising a transceiver and a decoder, the broadcast station configured to: (1) receive each of the data streams from the at least one base station; and (2) decode each of the data streams; and
   wherein the ENG network is configured to: (1) assign a priority level to each of the data streams; and (2) prioritize the transmission of each of the data streams from the plurality of ENG units to the broadcast station based on the assigned priority levels, wherein a first ENG unit of the plurality of ENG units is configured to mark a first data stream of the plurality of data streams, the first data stream being encoded by the first ENG unit, with a priority level indicator based on the assigned priority levels.

15. The ENG network of claim 14 wherein the priority level of each of the data streams is assigned using a differentiated services (DS) field and a differentiated services code point (DSCP) field in each data stream.

16. The ENG network of claim 14 wherein the assignment of the priority level of each of the data streams is based on parameters, the parameters comprising (i) Destination IP and Port, (ii) Source IP and Port, (iii) WAN Tag, and (iv) Protocol.

17. The ENG network of claim 14 wherein the priority level to each of the data streams is one of (i) expedited forwarding, (ii) assured forwarding or (iii) best effort forwarding.

18. The ENG network of claim 14 wherein an ENG unit of the plurality of ENG units is configured to assign the priority level of each of the data streams.

19. The ENG network of claim 14 wherein a base station of the at least one base station is configured to assign the priority level of each of the data streams.

20. The ENG network of claim 14 further comprising:
a selection mechanism configured to assign the priority level of each of the data streams, the selection mechanism operated by an operator.

21. The ENG network method of claim 20 wherein the selection mechanism is further configured to transmit network control information to the plurality of ENG units and the at least one base station, the network control information assigning the priority level to each of the data streams.

22. The ENG network of claim 21 wherein the transmitted network control information is configured to change the priority level of a first data stream of a first ENG unit of the plurality of ENG units to expedited forwarding and the priority level of remaining data streams of remaining ENG units of the plurality of ENG units to either assured forwarding or best effort forwarding, thereby ensuring that the first data stream has the highest priority level of each of the data streams.

23. The ENG network of claim 14 wherein the at least one base station is part of at least one of the following: a mobile cellular network, a WiFi network, a public WiMax network, a private WiMax network, a VSAT, a BGAN and a satellite network.

24. The ENG network of claim 14 wherein each of the data streams comprises video and audio data.

25. The ENG network of claim 14 wherein the reception of at least one data stream of each of the data streams by the broadcast station is done substantially in real time.

26. The ENG network of claim 14 wherein the plurality of ENG units are further configured to transmit the data stream to the at least one base station as a single data stream.

27. A method of prioritizing the upload of a recording of a live event from a remote location comprising:
transmitting network control information with a selection mechanism to an electronic news gathering (ENG) network, the network control information assigning a priority level of a data stream of a first ENG unit in the ENG network, the ENG network comprising at least two ENG units, at least one base station and a broadcast station;
recording the live event at the remote location using the first ENG unit, the live event being recorded by the first ENG unit as a signal including both audio and video data;
encoding the signal into the data stream with the first ENG unit;
transmitting the data stream with the first ENG unit to the broadcast station via the at least one base station, wherein the first ENG unit wirelessly transmits the data stream to the at least one base station, wherein the transmission of the data stream is prioritized based on the assigned priority level, and wherein the first ENG unit is configured to mark the data stream with a priority level indicator based on the assigned priority level; and
receiving and decoding the data stream at the broadcast station.

28. The method of claim 27 wherein a plurality of other data streams from a plurality of other ENG units are being transmitted over the ENG network during the transmission of the data stream of the first ENG unit, the transmission of the data stream of the first ENG unit being prioritized over the transmission of the other data streams.

29. The method of claim 27 where the priority level of the first data stream is assigned using a differentiated services (DS) field and a differentiated services code point (DSCP) field in the data stream.

* * * * *